United States Patent
Liu et al.

(10) Patent No.: US 10,562,359 B2
(45) Date of Patent: Feb. 18, 2020

(54) DEVICE FOR INSERTING INFLATING VALVE

(71) Applicant: CITIC Dicastal CO., LTD., Qinhuangdao, Hebei (CN)

(72) Inventors: Weidong Liu, Qinhuangdao (CN); Fengyan Liu, Qinhuangdao (CN); Jinling Yang, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 7 days.

(21) Appl. No.: 16/112,054

(22) Filed: Aug. 24, 2018

(65) Prior Publication Data

US 2019/0061445 A1 Feb. 28, 2019

(30) Foreign Application Priority Data

Aug. 25, 2017 (CN) .......................... 2017 1 0740096

(51) Int. Cl.
*B60C 25/18* (2006.01)
*B21D 53/30* (2006.01)
*B23P 19/10* (2006.01)
*B23P 19/12* (2006.01)

(52) U.S. Cl.
CPC ............ *B60C 25/185* (2013.01); *B21D 53/30* (2013.01); *B23P 19/10* (2013.01); *B23P 19/107* (2013.01); *B23P 19/12* (2013.01); *B60C 25/18* (2013.01)

(58) Field of Classification Search
CPC ....... B60C 25/18; B60C 25/185; B21D 53/30; B23P 19/10; B23P 19/107; B23P 19/12
See application file for complete search history.

(56) References Cited

U.S. PATENT DOCUMENTS

| | | | | |
|---|---|---|---|---|
| 4,353,156 A | * | 10/1982 | Rosaz ..................... | B23P 19/04 29/221.5 |
| 5,940,960 A | * | 8/1999 | Doan ...................... | B23P 19/04 29/221.5 |
| 7,111,388 B2 | | 9/2006 | Kwon | |
| 2003/0051326 A1 | * | 3/2003 | Lawson ................. | B23P 19/04 29/407.01 |
| 2004/0177506 A1 | * | 9/2004 | Pellerin .................. | B23P 19/04 29/890.123 |

FOREIGN PATENT DOCUMENTS

| | | |
|---|---|---|
| CN | 104057276 A | 9/2014 |
| CN | 205950211 U | 2/2017 |

* cited by examiner

*Primary Examiner* — Jermie E Cozart
(74) *Attorney, Agent, or Firm* — Cooper Legal Group, LLC

(57) ABSTRACT

The present disclosure provides a device for inserting an inflating valve, comprising a synchronous clamping and centering mechanism, a synchronous rotating mechanism, a valve hole position detection mechanism and an inflating valve inserting mechanism. The device can meet the requirement for automatically inserting an inflating valve to a wheel, has the characteristics of simple structure, convenient manufacture, stable performance and precision that can meet the machining requirement, and can meet the requirements for automatic production.

5 Claims, 7 Drawing Sheets

DEVICE FOR INSERTING INFLATING VALVE

CROSS-REFERENCE TO RELATED APPLICATION

The present application claims benefit of Chinese Patent Application No. 201710740096.9, filed on Aug. 25, 2017, the contents of which are hereby incorporated by reference in its entirety.

BACKGROUND

In machining of an automobile wheel, in order to ensure the quality of the wheel, the airtightness of the wheel needs to be detected completely. During the detection, it is necessary to add an inflating valve to the machined wheel, and to ensure the authenticity of the test result. Wheel manufacturers often adopt the method of manually installing inflating valves. As the production automation increases, manipulators gradually replace manual installation of inflating valves. The present disclosure provides a device for automatically supplying an inflating valve, which cooperates with a manipulator to complete the function of installing the inflating valve to a wheel.

SUMMARY

The present disclosure relates to a machining device, specifically to a device for automatically inserting an inflating valve in a wheel machining process.

The object of the present disclosure is to provide a device for inserting an inflating valve.

In order to achieve the above object, the present disclosure provides a device for inserting an inflating valve according to the present disclosure mainly composed of a first synchronous pulley, a dynamic synchronous pulley, a synchronous belt, a second synchronous pulley, a frame, a base, a first guide rail sliding seat, a first linear guide rail, a connecting plate, a rotating motor, a guide rail rack, a mounting platform, a turnover seat, a first lead screw, a first servo motor, a turnover block, a third linear guide rail, a third guide rail sliding seat, a second servo motor, a second lead screw, a second linear guide rail, a bracket, a third servo motor, a second guide rail sliding seat, a sliding seat rack, a pneumatic mechanical chuck, an inflating valve, a roller, a roller bed sprocket, a roller bed bracket, a power sprocket, a roller bed motor, rotating wheels, rotating shafts, an end cover, bearings, a shaft sleeve, lead screw supports, left and right threaded lead screws, screw nuts, a cylinder connecting plate, a cylinder seat, a cylinder flange, a cylinder, a mounting rack, a detector and a third lead screw. The device may include a synchronous clamping centering mechanism, a synchronous rotating mechanism, a valve hole position detection mechanism and an inflating valve inserting mechanism.

I. A synchronous clamping centering mechanism: the cylinder seat is fixed on the side of the frame, the cylinder is fixed on the frame via the cylinder flange and the cylinder seat, and an output rod of the cylinder is connected to the cylinder connecting plate; the base is fixed on the frame, the first linear guide rail is mounted on the base, and the first linear guide rail is connected with the connecting plate via the first guide rail sliding seat; the lead screw supports are fixed on the frame, the two screw nuts are respectively fixed to the connecting plate on the left and right sides, and the left and right threaded lead screws are connected to the screw nuts and the lead screw supports respectively.

After the cylinder is charged with air, an output shaft of the cylinder drives a right driven rotating portion to move toward the middle along the first linear guide rail via the first guide rail sliding seat and the first linear guide rail. At the same time, the left and right threaded lead screws start to rotate. Under the co-action of the left and right threaded lead screws and the screw nuts on the left and right sides, a left driving rotating portion moves toward the middle along the first linear guide rail, and the four rotating wheels on the left and right rotating portions are synchronously centered toward the central positions of the four rotating shafts and clamp the rim of a wheel. Thus, the wheel is synchronously clamped and centered. The device can meet the requirements of synchronous clamping and centering of wheels having different sizes.

II. A synchronous rotating mechanism: the rotating motor and the shaft sleeve are mounted on the connecting plate, the end cover is mounted on the shaft sleeve, the bearings and the rotating shafts are enclosed inside the shaft sleeve and the connecting plate, two rotating wheels and the first synchronous pulley or the second synchronous pulley are mounted at each of the two ends of the rotating shafts, the dynamic synchronous pulley is mounted on the rotating motor shaft, and the first synchronous pulley, the second synchronous pulley and the dynamic synchronous pulley are connected via the synchronous belt; the roller bed support is fixed on the frame, the roller is connected with the roller bed support via the roller bed sprocket, the roller bed motor is fixed on the roller bed support, and the power sprocket is mounted on the roller bed motor.

The rotating motor drives the first synchronous pulley and the second synchronous pulley to rotate via the dynamic synchronous pulley and the synchronous belt, the rotating wheels are driven by the rotating shafts to rotate, the rim of the wheel is in contact fit with the rotating wheels after the wheel is centered via the synchronous clamping and centering mechanism, and the two synchronous rotating wheels on the left side drive the wheel to rotate.

III. A valve hole position detection mechanism: the mounting rack is fixed on the frame, and the detector is mounted on the mounting frame.

By adjusting the position of the detector on the mounting rack, the requirements for detecting wheels of different sizes can be met.

IV. An inflating valve inserting mechanism: the third servo motor and the third linear guide rail are fixed on the frame via the guide rail rack, the sliding seat rack is connected with the third linear guide rail via the third guide rail sliding seat, and the third lead screw is connected with the sliding seat rack and the third servo motor respectively. The third servo motor can drive the sliding seat rack to move up and down along the third linear guide rail via the third lead screw.

The second servo motor and the second linear guide rail are fixed on the sliding seat rack, the bracket is connected with the second linear guide rail via the second guide rail sliding seat, and the second lead screw is connected with the bracket and the second servo motor respectively. The second servo motor can drive the bracket to move horizontally along the second linear guide rail via the second lead screw.

The first servo motor and the turnover seat are fixed on the bracket, the first servo motor is connected with the first lead screw, the pneumatic mechanical chuck is fixed on the turnover block through the mounting platform, the pneumatic mechanical chuck holds the inflating valve, the first servo motor is connected with the first lead screw, an empty slot—is formed in the middle of the bottom surface of the turnover seat, the first lead screw passes through the empty slot—, symmetrical T-shaped ring grooves—are formed in the two inner sides of the turnover seat, two symmetrical T-shaped ring columns—are arranged on the lower end face of the turnover block, and the T-shaped ring columns—can be inserted into the T-shaped ring grooves—; ring teeth—are arranged in the middle of the lower end face of the turnover block and engaged with the first lead screw. The first servo motor drives the first lead screw to rotate. Through the engagement of the ring teeth—and the first lead screw, the turnover block drives the mounting platform and the inflating valve to rotate along the center of the T-shaped ring grooves—in the turnover seat.

According to the change of angles of valve holes of different wheels, the turnover block drives the mounting platform and the inflating valve to rotate corresponding angles, thereby meeting the requirement for inserting inflating valves to different wheels.

In actual use, a wheel is transported to the working position of the device via a roller bed, compressed air is introduced, and the cylinder drives the right driving rotating portion to move toward the middle along the first linear guide rail via the first guide rail sliding seat and the first linear guide rail. At the same time, the left and right threaded lead screws start to rotate. Under the co-action of the left and right threaded lead screws and the screw nuts on the left and right sides, the left driven rotating portion moves toward the middle along the first linear guide rail, and the four rotating wheels on the left and right rotating portions are synchronously centered toward the central positions of the four rotating shafts and clamp the rim of the wheel. Thus, the wheel is synchronously clamped and centered. Then, the rotating motor drives the first synchronous pulley and the second synchronous pulley to rotate via the dynamic synchronous pulley and the synchronous belt, the rotating wheels are driven by the rotating shafts to rotate, the rim of the wheel is in contact fit with the rotating wheels after the wheel is centered via the synchronous clamping and centering mechanism, and the two synchronous rotating wheels on the left side drive the wheel to rotate. During the rotation of the wheel, the detector detects a wheel valve hole, then the wheel continues to rotate 180°, the valve hole of the wheel and the inflating valve are on the same vertical detection surface, and the first servo motor drives the first lead screw to rotate. Through the engagement of the ring teeth—and the first lead screw, the turnover block drives the mounting platform and the inflating valve to rotate along the center of the T-shaped ring grooves—in the turnover seat. According to the size and structure characteristics of the machined wheel, the first servo motor controls the inflating valve to rotate the same angle of the wheel valve hole via a pre-input program, at the same time, the first servo motor and the second servo motor control the inflating valve to move to a position below the valve hole, the center line of an inflating valve shaft is superposed with the center line of the inflating valve, finally, the inflating valve is controlled to move up obliquely and inserted into the wheel valve hole, and the pneumatic mechanical chuck releases the inflating valve and is reset. So far, the automatic insertion to the valve hole is completed.

The device can meet the requirement for automatically inserting an inflating valve to a wheel, has the characteristics of simple structure, convenient manufacture, stable performance and precision that can meet the machining requirement, and can meet the requirements for automatic production.

BRIEF DESCRIPTION OF DRAWINGS

The embodiments of the present disclosure will be described in detail below in combination with the accompanying drawings, in which:

FIG. 1A and FIG. 1B are structure diagrams of a device for inserting an inflating valve according to the present disclosure, in which FIG. 1A is a front view of the device, and FIG. 1B is a top view.

FIG. 3A and FIG. 3B are structure diagrams of a turnover seat in the device for inserting an inflating valve according to the present disclosure, in which FIG. 3A is a top view, and FIG. 3B is a sectional view.

FIG. 4A and FIG. 4B are structure diagrams of a turnover block in the device for inserting an inflating valve according to the present disclosure, in which FIG. 4A is a top view, and FIG. 4B is a sectional view.

FIG. 5A and FIG. 5B are structure diagrams of a turnover mechanism in the device for inserting an inflating valve according to the present disclosure, in which FIG. 5A is a top view, and FIG. 5B is a sectional view.

FIG. 6A and FIG. 6B are structure diagrams when the device for inserting an inflating valve according to the present disclosure works, in which FIG. 6A is a front view of the device, and FIG. 6B is a top view.

LIST OF REFERENCE SYMBOLS

Figure 1A:
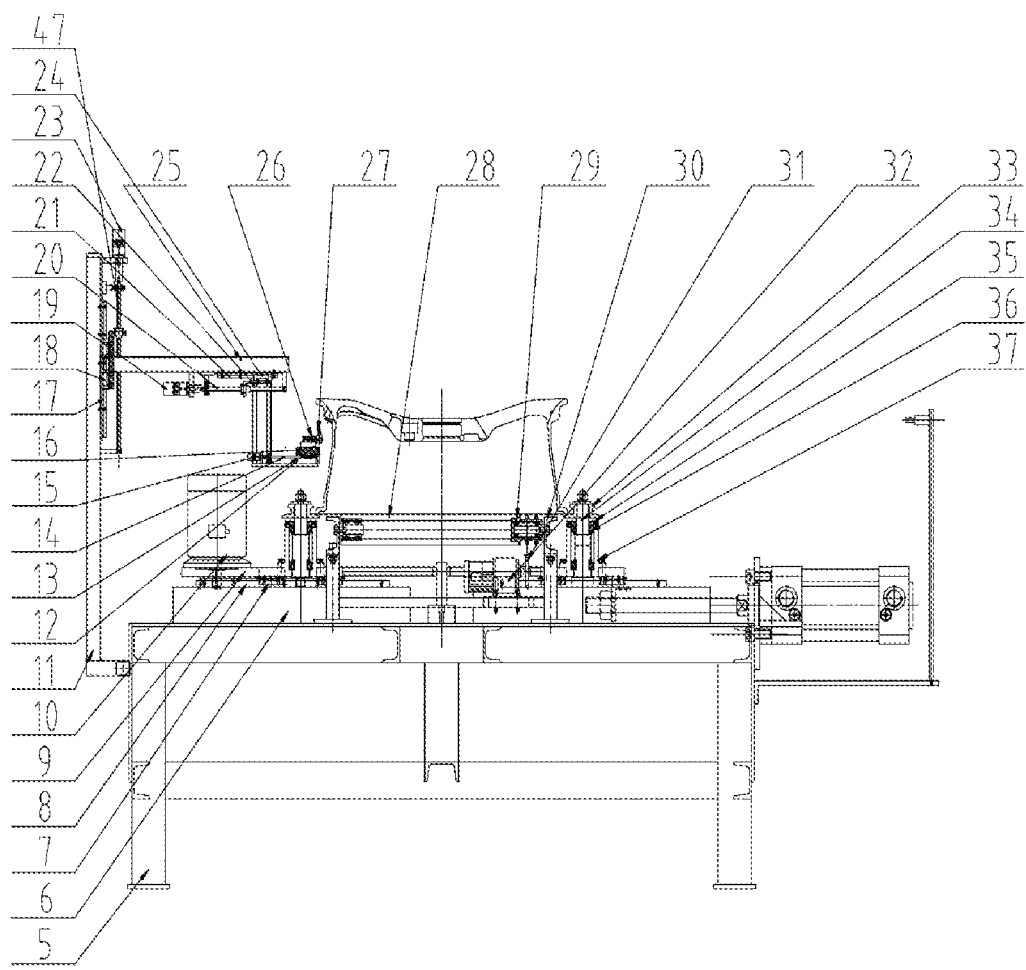
Figure 1B:
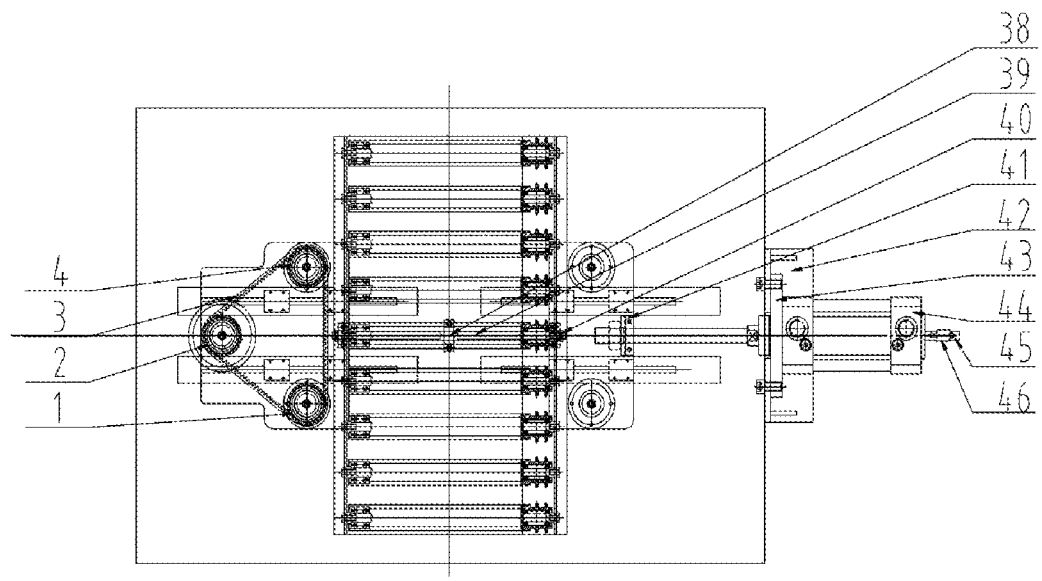
Figure 2:
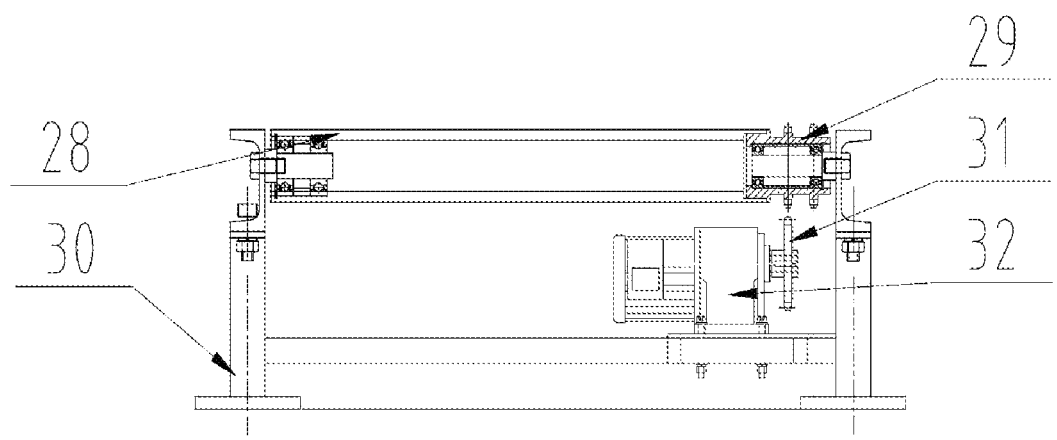
FIG. 2 is a structure diagram of a roller bed in the device for inserting an inflating valve according to the present disclosure.
Figure 3A:
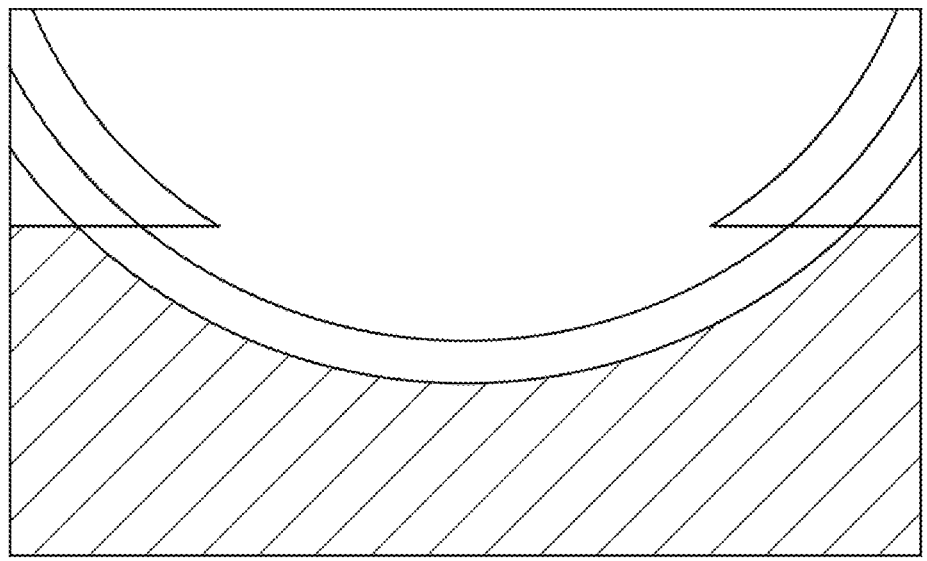
Figure 3B:
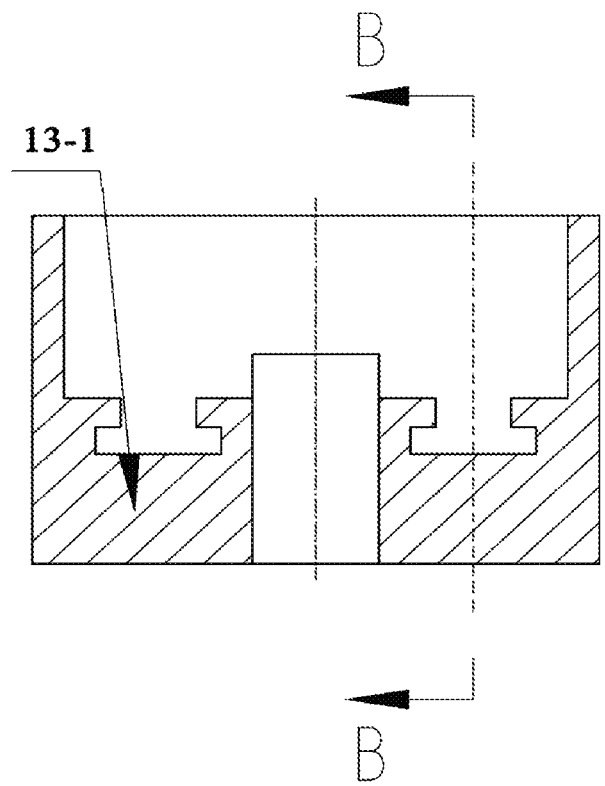
Figure 4A:
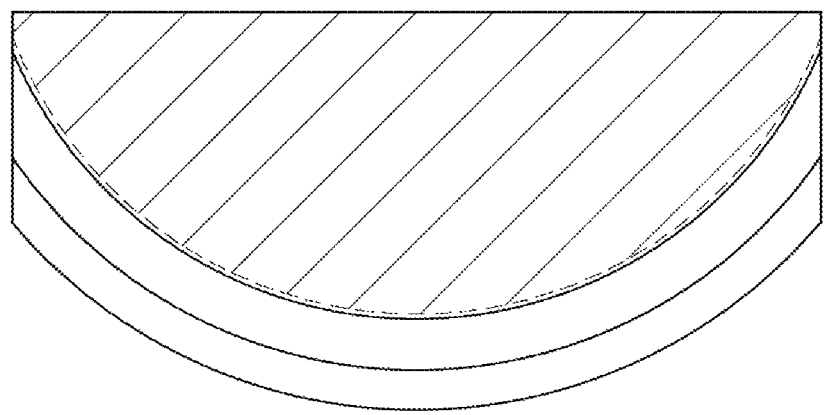
Figure 4B:
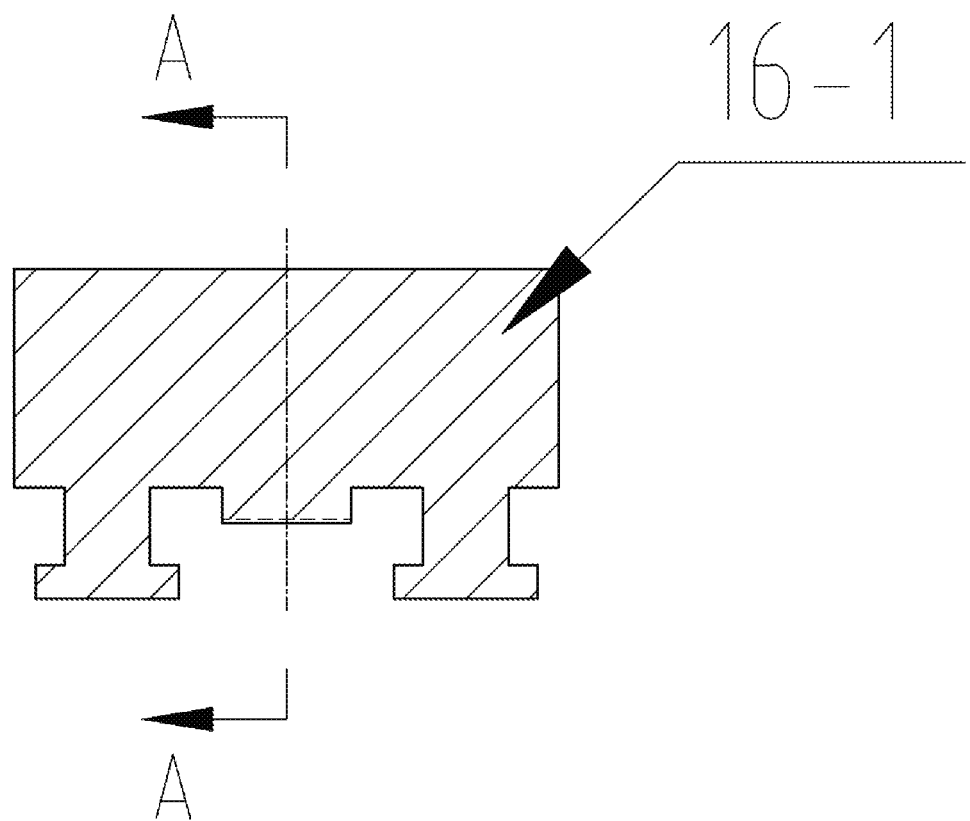
Figure 5A:
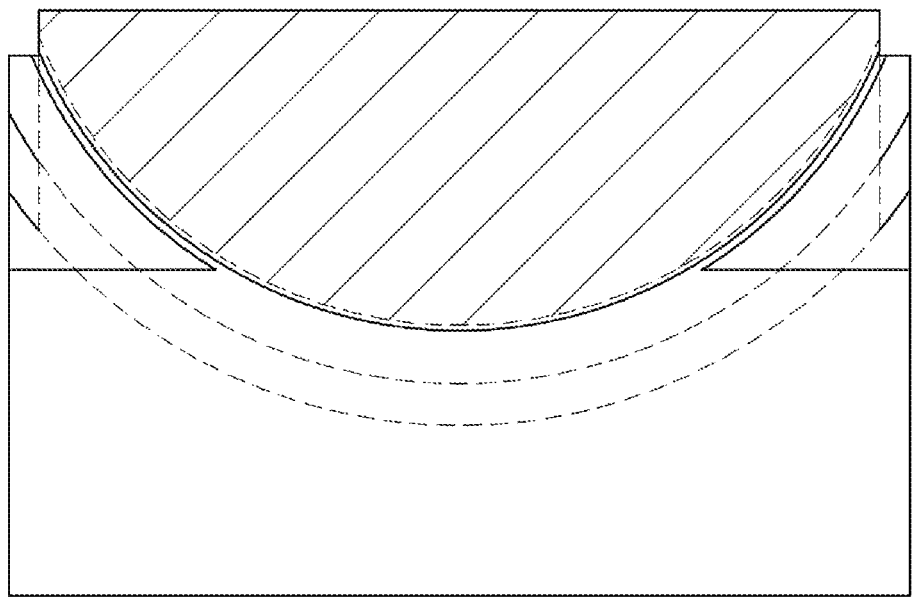
Figure 5B:
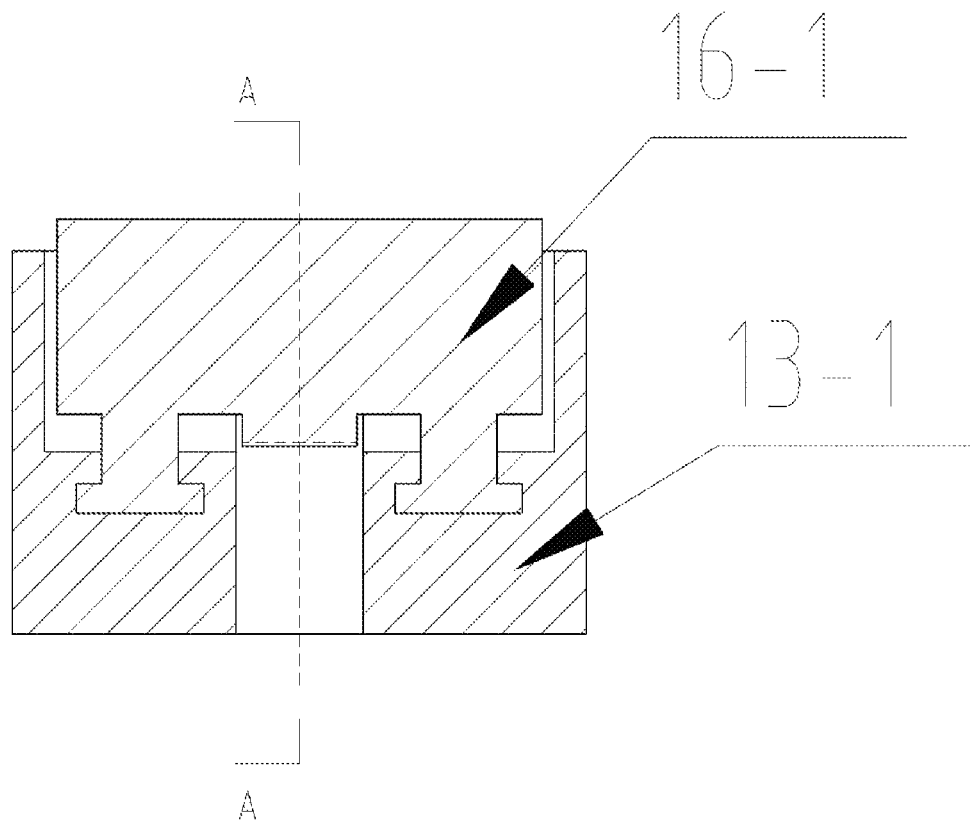
Figure 6A:
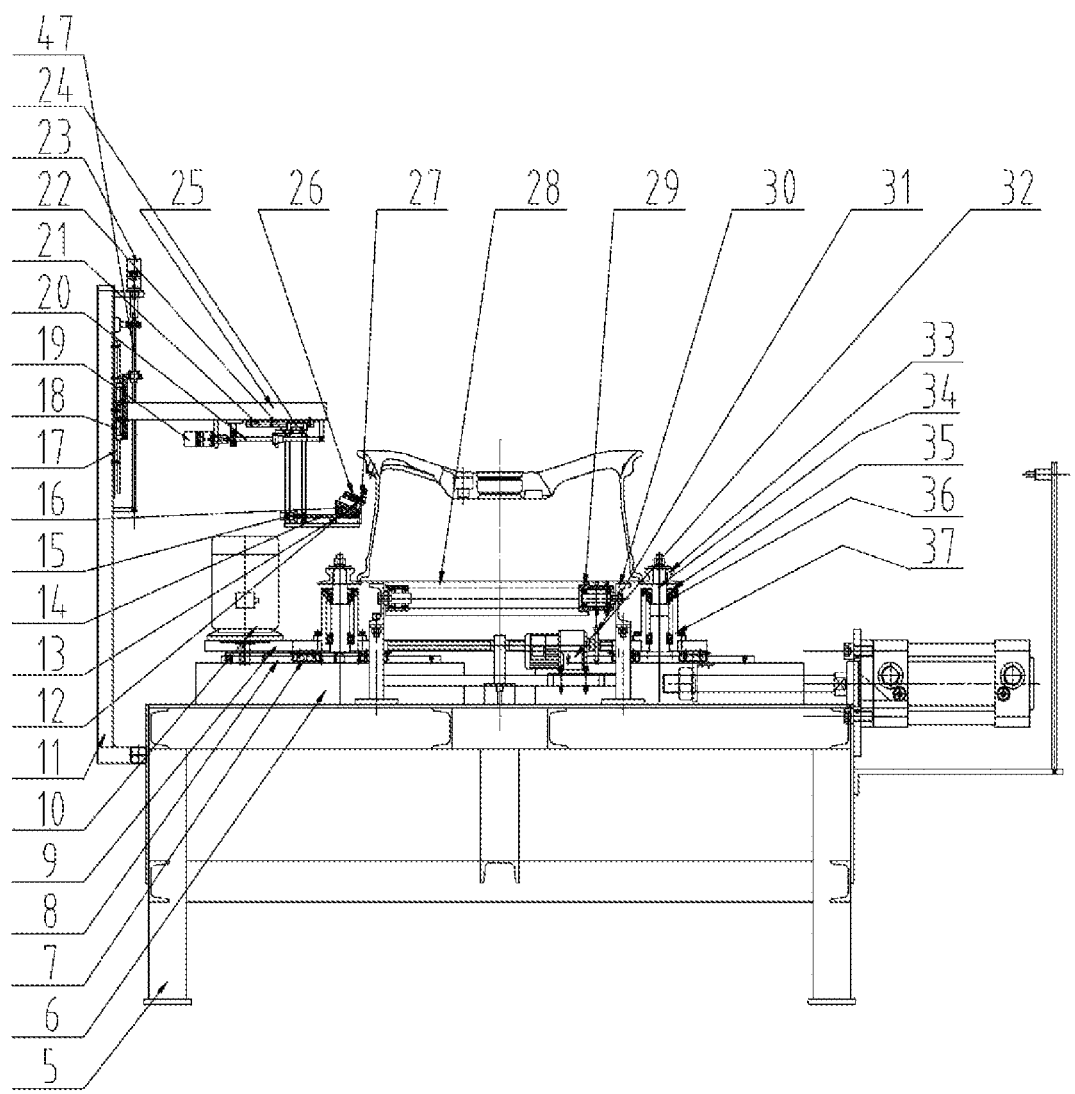
Figure 6B:
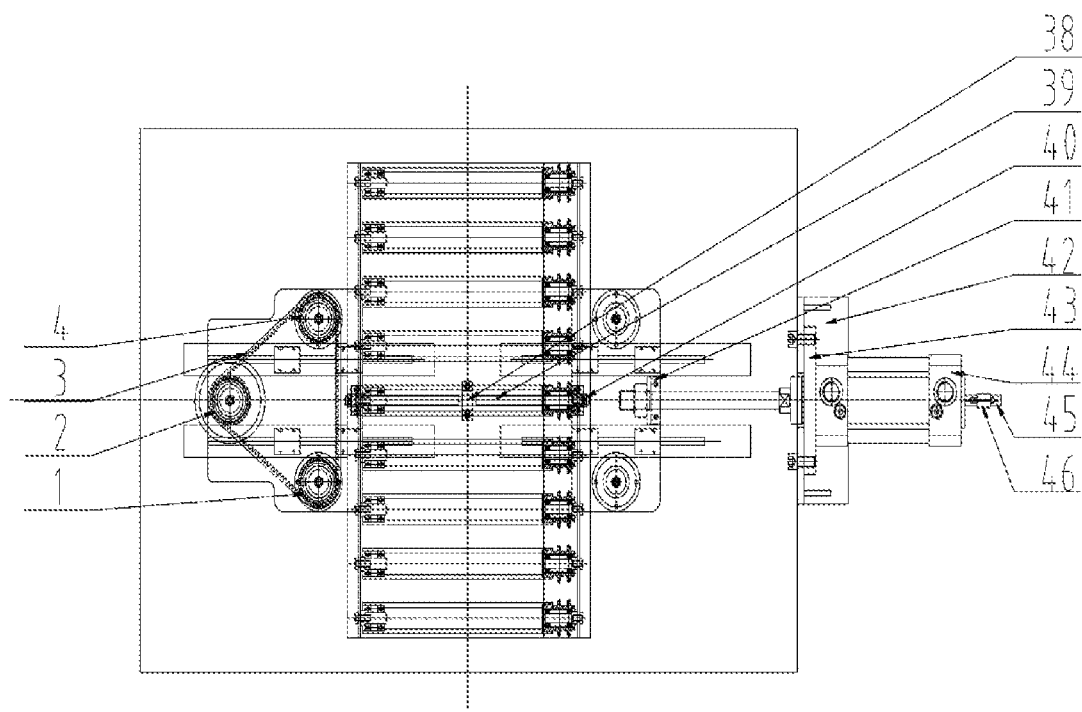

1—first synchronous pulley, 2—dynamic synchronous pulley, 3—synchronous belt, 4—second synchronous pulley, 5—frame, 6—base, 7—first guide rail sliding seat, 8—first linear guide rail, 9—connecting plate, 10—rotating motor, 11—guide rail rack, 12—mounting platform, 13—turnover seat, 14—first lead screw, 15—first servo motor, 16—turnover block, 17—third linear guide rail, 18—third guide rail sliding seat, 19—second servo motor, 20—second lead screw, 21—second linear guide rail, 22—bracket, 23—third servo motor, 24—second guide rail sliding seat, 25—sliding seat rack, 26—pneumatic mechanical chuck, 27—inflating valve, 28—roller, 29—roller bed sprocket, 30—roller bed bracket, 31—power sprocket, 32—roller bed motor, 33—rotary wheel, 34—rotating shaft, 35—end cover, 36—bearing, 37—shaft sleeve, 38—lead screw support, 39—left and right threaded lead screw, 40—screw nut, 41—cylinder connecting plate, 42—cylinder seat, 43—cylinder flange, 44—cylinder, 45—mounting rack, 46—detector, 47—third lead screw.

DETAILED DESCRIPTION

The details and working conditions of the specific device proposed according to the present disclosure will be described in detail below in combination with the accompanying drawings.

A device for inserting an inflating valve according to the present disclosure is mainly composed of a first synchronous pulley 1, a dynamic synchronous pulley 2, a synchronous belt 3, a second synchronous pulley 4, a frame 5, a base 6, a first guide rail sliding seat 7, a first linear guide rail 8, a connecting plate 9, a rotating motor 10, a guide rail rack 11, a mounting platform 12, a turnover seat 13, a first lead screw 14, a first servo motor 15, a turnover block 16, a third linear guide rail 17, a third guide rail sliding seat 18, a second servo motor 19, a second lead screw 20, a second linear guide rail 21, a bracket 22, a third servo motor 23, a second guide rail sliding seat 24, a sliding seat rack 25, a pneumatic mechanical chuck 26, an inflating valve 27, a roller 28, a roller bed sprocket 29, a roller bed bracket 30, a power sprocket 31, a roller bed motor 32, rotating wheels 33, rotating shafts 34, an end cover 35, bearings 36, a shaft sleeve 37, lead screw supports 38, left and right threaded lead screws 39, screw nuts 40, a cylinder connecting plate 41, a cylinder seat 42, a cylinder flange 43, a cylinder 44, a mounting rack 45, a detector 46 and a third lead screw 47.

I. A synchronous clamping centering mechanism: the cylinder seat 42 is fixed on the side of the frame 5, the cylinder 44 is fixed on the frame 5 via the cylinder flange 43 and the cylinder seat 42, and an output rod of the cylinder 44 is connected to the cylinder connecting plate 41; the base 6 is fixed on the frame 5, the first linear guide rail 8 is mounted on the base 6, and the first linear guide rail 8 is connected with the connecting plate 9 via the first guide rail sliding seat 7; the lead screw supports 38 are fixed on the frame 5, the two screw nuts 40 are respectively fixed to the connecting plate 9 on the left and right sides, and the left and right threaded lead screws 39 are connected to the screw nuts 40 and the lead screw supports 38 respectively.

After the cylinder 44 is charged with air, an output shaft of the cylinder 44 drives a right driven rotating portion to move toward the middle along the first linear guide rail 8 via the first guide rail sliding seat 7 and the first linear guide rail 8. At the same time, the left and right threaded lead screws 39 start to rotate. Under the co-action of the left and right threaded lead screws 39 and the screw nuts 40 on the left and right sides, a left driving rotating portion moves toward the middle along the first linear guide rail 8, and the four rotating wheels 33 on the left and right rotating portions are synchronously centered toward the central positions of the four rotating shafts 34 and clamp the rim of a wheel. Thus, the wheel is synchronously clamped and centered. The device can meet the requirements of synchronous clamping and centering of wheels having different sizes.

II. A synchronous rotating mechanism: the rotating motor 10 and the shaft sleeve 37 are mounted on the connecting plate 9, the end cover 35 is mounted on the shaft sleeve 37, the bearings 36 and the rotating shafts 34 are enclosed inside the shaft sleeve 37 and the connecting plate 9, two rotating wheels 33 and the first synchronous pulley 1 or the second synchronous pulley 4 are mounted at each of the two ends of the rotating shafts 34, the dynamic synchronous pulley 2 is mounted on the rotating motor shaft 10, and the first synchronous pulley 1, the second synchronous pulley 4 and the dynamic synchronous pulley 2 are connected via the synchronous belt 3; the roller bed support 30 is fixed on the frame 5, the roller 28 is connected with the roller bed support 30 via the roller bed sprocket 29, the roller bed motor 32 is fixed on the roller bed support 30, and the power sprocket 31 is mounted on the roller bed motor 32.

The rotating motor 10 drives the first synchronous pulley 1 and the second synchronous pulley 4 to rotate via the dynamic synchronous pulley 2 and the synchronous belt 3, the rotating wheels 33 are driven by the rotating shafts 34 to rotate, the rim of the wheel is in contact fit with the rotating wheels 33 after the wheel is centered via the synchronous clamping and centering mechanism, and the two synchronous rotating wheels 33 on the left side drive the wheel to rotate.

III. A valve hole position detection mechanism: the mounting rack 45 is fixed on the frame 5, and the detector 46 is mounted on the mounting frame 45.

By adjusting the position of the detector 46 on the mounting rack 45, the requirements for detecting wheels of different sizes can be met.

IV. An inflating valve inserting mechanism: the third servo motor 23 and the third linear guide rail 17 are fixed on the frame 5 via the guide rail rack 11, the sliding seat rack 25 is connected with the third linear guide rail 17 via the third guide rail sliding seat 18, and the third lead screw 47 is connected with the sliding seat rack 25 and the third servo motor 23 respectively. The third servo motor 23 can drive the sliding seat rack 25 to move up and down along the third linear guide rail 17 via the third lead screw 47.

The second servo motor 19 and the second linear guide rail 21 are fixed on the sliding seat rack 25, the bracket 22 is connected with the second linear guide rail 21 via the second guide rail sliding seat 24, and the second lead screw 20 is connected with the bracket 22 and the second servo motor 19 respectively. The second servo motor 19 can drive the bracket 22 to move horizontally along the second linear guide rail 21 via the second lead screw 20.

The first servo motor 15 and the turnover seat 13 are fixed on the bracket 22, the first servo motor 15 is connected with the first lead screw 14, the pneumatic mechanical chuck 26 is fixed on the turnover block 16 through the mounting platform 12, the pneumatic mechanical chuck 26 holds the inflating valve 27, the first servo motor 15 is connected with the first lead screw 14, an empty slot 13-2 is formed in the middle of the bottom surface of the turnover seat 13, the first lead screw 14 passes through the empty slot 13-2, symmetrical T-shaped ring grooves 13-1 are formed in the two inner sides of the turnover seat 13, two symmetrical T-shaped ring columns 16-1 are arranged on the lower end face of the turnover block 16, and the T-shaped ring columns 16-1 can be inserted into the T-shaped ring grooves 13-1; ring teeth 16-2 are arranged in the middle of the lower end face of the turnover block 16 and engaged with the first lead screw 14. The first servo motor 15 drives the first lead screw 14 to rotate. Through the engagement of the ring teeth 16-2 and the first lead screw 14, the turnover block 16 drives the mounting platform 12 and the inflating valve 27 to rotate along the center of the T-shaped ring grooves 13-1 in the turnover seat 13. According to the change of angles of valve holes of different wheels, the turnover block 16 drives the mounting platform 12 and the inflating valve 27 to rotate corresponding angles, thereby meeting the requirement for inserting inflating valves to different wheels.

In actual use, a wheel is transported to the working position of the device via a roller bed, compressed air is introduced, and the cylinder 44 drives the right driving rotating portion to move toward the middle along the first linear guide rail 8 via the first guide rail sliding seat 7 and the first linear guide rail 8. At the same time, the left and right threaded lead screws 39 start to rotate. Under the co-action of the left and right threaded lead screws 39 and the screw nuts 40 on the left and right sides, the left driven rotating portion moves toward the middle along the first linear guide rail 8, and the four rotating wheels 33 on the left and right rotating portions are synchronously centered toward the central positions of the four rotating shafts 34 and clamp the rim of the wheel. Thus, the wheel is synchronously clamped and centered. Then, the rotating motor 10 drives the first synchronous pulley 1 and the second synchronous pulley 4 to rotate via the dynamic synchronous pulley 2 and the synchronous belt 3, the rotating wheels 33 are driven by the rotating shafts 34 to rotate, the rim of the wheel is in contact fit with the rotating wheels 33 after the wheel is centered via the synchronous clamping and centering mechanism, and the two synchronous rotating wheels 33 on the left side drive the wheel to rotate. During the rotation of the wheel, the detector 46 detects a wheel valve hole, then the wheel continues to rotate 180°, the valve hole of the wheel and the inflating valve 27 are on the same vertical detection surface, and the first servo motor 15 drives the first lead screw 14 to rotate. Through the engagement of the ring teeth 16-2 and the first lead screw 14, the turnover block 16 drives the mounting platform 12 and the inflating valve 27 to rotate along the center of the T-shaped ring grooves 13-1 in the turnover seat 13. According to the size and structure characteristics of the machined wheel, the first servo motor 15 controls the inflating valve 27 to rotate the same angle of the wheel valve hole via a pre-input program, at the same time, the first servo motor 15 and the second servo motor 19 control the inflating valve 27 to move to a position below the valve hole, the center line of an inflating valve shaft is superposed with the center line of the inflating valve 27, finally, the inflating valve 27 is controlled to move up obliquely and inserted into the wheel valve hole, and the pneumatic mechanical chuck 26 releases the inflating valve 27 and is reset. So far, the automatic insertion to the valve hole is completed.

The invention claimed is:

1. A device for inserting an inflating valve comprising a first synchronous pulley, a dynamic synchronous pulley, a synchronous belt, a second synchronous pulley, a frame, a base, a first guide rail sliding seat, a first linear guide rail, a connecting plate, a rotating motor, a guide rail rack, a mounting platform, a turnover seat, a first lead screw, a first servo motor, a turnover block, a third linear guide rail, a third guide rail sliding seat, a second servo motor, a second lead screw, a second linear guide rail, a bracket, a third servo motor, a second guide rail sliding seat, a sliding seat rack, a pneumatic mechanical chuck, the inflating valve, a roller, a roller bed sprocket, a power sprocket, a roller bed motor, rotating wheels, rotating shafts, an end cover, bearings, a shaft sleeve, lead screw supports, left and right threaded lead screws, screw nuts, a cylinder connecting plate, a cylinder seat, a cylinder flange, a cylinder, a mounting rack, a detector and a third lead screw; the device comprises a synchronous clamping and centering mechanism, in which the cylinder seat is fixed on a side of the frame, the cylinder is fixed on the frame via the cylinder flange and the cylinder seat, and an output rod of the cylinder is connected to the cylinder connecting plate; the base is fixed on the frame, the first linear guide rail is mounted on the base, and the first linear guide rail is connected with the connecting plate via the first guide rail sliding seat; the lead screw supports are fixed on the frame, the screw nuts are respectively fixed to the connecting plate on left and right sides of the connecting plate, and the left and right threaded lead screws are connected to the screw nuts and the lead screw supports respectively; the device comprises a synchronous rotating mechanism, in which the rotating motor and the shaft sleeve are mounted on the connecting plate, the end cover is mounted on the shaft sleeve, the bearings and the rotating shafts are enclosed inside the shaft sleeve and the connecting plate, two rotating wheels of the rotating wheels and the first synchronous pulley or the second synchronous pulley are mounted at each of the two ends of the rotating shafts, the dynamic synchronous pulley is mounted on the rotating motor, and the first synchronous pulley, the second synchronous pulley and the dynamic synchronous pulley are connected via the synchronous belt; a roller bed support is fixed on the frame, the roller is connected with the roller bed support via the roller bed sprocket, the roller bed motor is fixed on the roller bed support, and the power sprocket is mounted on the roller bed motor; the device comprises a valve hole position detection mechanism, in which the mounting rack is fixed on the frame, and the detector is mounted on the mounting rack; and the device comprises an inflating valve inserting mechanism, in which the third servo motor and the third linear guide rail are fixed on the frame via the guide rail rack, the sliding seat rack is connected with the third linear guide rail via the third guide rail sliding seat, and the third lead screw is connected with the sliding seat rack and the third servo motor respectively; the third servo motor is configured to drive the sliding seat rack to move up and down along the third linear guide rail via the third lead screw; the second servo motor and the second linear guide rail are fixed on the sliding seat rack, the bracket is connected with the second linear guide rail via the second guide rail sliding seat, and the second lead screw is connected with the bracket and the second servo motor respectively; the third servo motor is configured to drive the bracket to move horizontally along the second linear guide rail via the second lead screw; the first servo motor and the turnover seat are fixed on the bracket, the first servo motor is connected with the first lead screw, the pneumatic mechanical chuck is fixed on the turnover block via the mounting platform, the pneumatic mechanical chuck holds the inflating valve, an empty slot is formed in a middle of a bottom surface of the turnover seat, the first lead screw passes through the empty slot, symmetrical T-shaped ring grooves are formed in two inner sides of the turnover seat, two symmetrical T-shaped ring columns are arranged on a lower end face of the turnover block, and the T-shaped ring columns are configured to be inserted into the T-shaped ring grooves; ring teeth are arranged in a middle of the lower end face of the turnover block and engaged with the first lead screw.

2. The device according to claim 1, wherein after the cylinder is charged with air, an output shaft of the cylinder drives a right driven rotating portion to move toward a middle along the first linear guide rail via the first guide rail sliding seat and the first linear guide rail; at the same time, the left and right threaded lead screws start to rotate; under the co-action of the left and right threaded lead screws and the screw nuts on the left and right sides of the connecting plate, a left driving rotating portion moves toward the middle along the first linear guide rail, and four rotating wheels of the rotating wheels on the left driving rotating portion and the right driving rotating portion[s] are synchronously centered toward central positions of four rotating shafts of the rotating shafts and clamp a rim of a wheel; thus, the wheel is synchronously clamped and centered; the device configured to meet requirements of synchronous clamping and centering of wheels having different sizes.

3. The device according to claim 1, wherein the rotating motor drives the first synchronous pulley and the second synchronous pulley to rotate via the dynamic synchronous pulley and the synchronous belt, the rotating wheels are driven by the rotating shafts to rotate, a rim of a wheel is in contact fit with the rotating wheels after the wheel is centered via the synchronous clamping and centering mechanism, and the two synchronous rotating wheels of the rotating wheels on a left side drive the wheel to rotate.

4. The device according to claim 1, wherein the device meets requirements for detecting wheels of different sizes by adjusting a position of the detector on the mounting rack.

5. The device according to claim 1, wherein the first servo motor drives the first lead screw to rotate, and through engagement of the ring teeth and the first lead screw, the turnover block drives the mounting platform and the inflating valve to rotate along a center of the T-shaped ring grooves in the turnover seat; according to a change of angles of valve holes of different wheels, the turnover block drives the mounting platform and the inflating valve to rotate to corresponding angles, thereby meeting a requirement for inserting inflating valves to different wheels.

* * * * *